(12) United States Patent
Patti et al.

(10) Patent No.: US 7,120,195 B2
(45) Date of Patent: Oct. 10, 2006

(54) SYSTEM AND METHOD FOR ESTIMATING MOTION BETWEEN IMAGES

(75) Inventors: Andrew Patti, Cupertino, CA (US); Yucel Altunbasak, Norcross, GA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 705 days.

(21) Appl. No.: 10/282,773

(22) Filed: Oct. 28, 2002

(65) Prior Publication Data

US 2004/0081239 A1    Apr. 29, 2004

(51) Int. Cl.
*H04N 7/12*    (2006.01)
*G06K 9/36*    (2006.01)

(52) U.S. Cl. .................. 375/240.03; 382/236

(58) Field of Classification Search .......... 375/240.03, 375/240.16, 240.13, 240.24; 382/236, 107
See application file for complete search history.

(56) References Cited

U.S. PATENT DOCUMENTS

| 5,469,226 | A |   | 11/1995 | David et al. |
| 5,612,746 | A | * | 3/1997 | Slavin ................... 375/240.24 |
| 5,822,007 | A |   | 10/1998 | Knee et al. |
| 6,122,017 | A |   | 9/2000 | Taubman |
| 6,167,086 | A | * | 12/2000 | Yu et al. ................. 375/240.03 |
| 6,256,347 | B1 | * | 7/2001 | Yu et al. ................. 375/240.13 |
| 6,430,317 | B1 | * | 8/2002 | Krishnamurthy et al. ... 382/236 |

* cited by examiner

*Primary Examiner*—Gims Philippe (57) ABSTRACT

A system and method for estimating motion between images performs correlation of candidate image blocks of a target digital image with potential image blocks of a reference digital image, in which pixel values of the images have been quantized, to estimate displacements of the candidate image blocks between the reference and target digital images. The correlation process may include a technique for counting the number of particular type bits in binary words. The counting technique involves performing bit-wise AND operations using a pair of masking binary words to derive first and second resulting binary words, shifting the second resulting binary word by a predefined number of bits and summing the first resulting binary word and the shifted binary word.

24 Claims, 6 Drawing Sheets

SYSTEM AND METHOD FOR ESTIMATING MOTION BETWEEN IMAGES

FIELD OF THE INVENTION

The invention relates generally to image processing, and more particularly to a system and method for estimating motion between images.

BACKGROUND OF THE INVENTION

Motion estimation is a useful tool in various image-processing operations such as video compression and mosaic image generation. In video compression, motion estimation is used to minimize redundancy between successive video frames to render pictures of higher quality without increasing the data amount for each video frame. In mosaic image generation, motion estimation is used to map video frames to create mosaic images. A mosaic image is a composite image that is created by stitching together successively captured video frames.

For mosaic image generation, the desired characteristics of the motion estimation include real-time output and accuracy. Since mosaic image generation typically involves extremely high video data rates, real-time output of the motion estimation is desired to discard frames with no new useful information. In addition, the motion estimation should be accurate as possible so that new information from subsequent frames can be placed appropriately within the context of the acquired information from the previous frames to prevent misalignment of pixel intensities in the resulting mosaic image, which will degrade the quality of the mosaic image.

Conventional motion estimation techniques commonly utilize block matching to estimate motion between two successive video frames, a reference video frame and a target video frame. The target video frame is typically the later captured video frame with respect to the reference video frame. In a block-matching motion estimation technique, a number of candidate blocks of the target video image are selected for motion estimation. Each candidate block is then correlated with all the blocks within a search window of a reference image to determine the position of a block within the search window that best "match" that candidate block. The positions of these matched blocks of the reference video frame are then used to generate motion vectors that represent the displacements of the candidate blocks to estimate the motion between the target and the reference video frames.

A concern with the conventional motion estimation techniques is that the process of correlating the candidate blocks of a target video frame with the blocks of a reference image within the respective search windows is computationally intensive, and consequently, requires significant amount of processing time. As a result, a number of modifications have been proposed to decrease the computational requirement of the conventional motion estimation techniques, such as hierarchical block matching and heuristic search block matching. However, these modifications typically come at a cost with respect to the accuracy of the motion estimation.

In view of the above-described concern, there is a need for a system and method for estimating motion between video frames in a less computationally intensive manner without significantly reducing the accuracy of the motion estimation.

SUMMARY OF THE INVENTION

A system and method for estimating motion between images performs correlation of candidate image blocks of a target digital image with potential image blocks of a reference digital image, in which pixel values of the images have been quantized, to estimate displacements of the candidate image blocks between the reference and target digital images. The use of quantized pixel values allows the correlation process to be based on simple XNOR operations. The correlation process may include an efficient technique for counting the number of particular type bits (e.g., the "1" bits) in binary words, which result from the XNOR operations. The efficient counting technique involves performing bit-wise AND operations using a pair of masking binary words to derive first and second resulting binary words, shifting the second resulting binary word by a predefined number of bits and summing the first resulting binary word and the shifted binary word. The use of quantized pixel values and the efficient counting technique allows the correlation process to be performed quicker than conventional correlation processes, which increases the speed of the motion estimation.

A system in accordance with the invention includes a quantizing module and a search module. The quantizing module is configured to quantize first and second digital images such that original pixel values of the first and second digital images are converted to quantized pixel values, which correspond to predefined ranges of the original pixel values. The search module is configured to correlate candidate image blocks of the second digital image with potential image blocks of the first digital image to derive translational indicators for the candidate image blocks, which relate to motion between the first and second digital images.

A method in accordance with the invention includes quantizing first and second digital images such that original pixel values of the first and second digital images are converted to quantized pixel values, which correspond to predefined ranges of the original pixel values, and correlating candidate image blocks of the second digital image with potential image blocks of the first digital image to derive translational indicators for the candidate image blocks. The translational indicators are related to motion between the first and second digital images.

Other aspects and advantages of the present invention will become apparent from the following detailed description, taken in conjunction with the accompanying drawings, illustrated by way of example of the principles of the invention.

DETAILED DESCRIPTION

In mosaic image generation, a scene of interest is panned by a video camera to capture a sequence of video frames. These sequentially captured video frames are then stitched together to generate a mosaic image. In order to stitch the video frames together, motion between two temporally proximate video frames is estimated to generate a mapping operator, which is used to convert the original pixel coordinates in one of the video frames ("the target video frame") into new pixel coordinates in accordance with the other video frame ("the reference video frame") such that after interpolating pixel intensities, the two video frames can be seamlessly combined to form a composite image. The motion between two sequentially captured video frames is defined herein as the displacement of features, which are common in both video frames, from the earlier captured video frame to the later captured video frame.

The problem of computing a mapping operator for mosaic image generation can be described mathematically as follows. If $f_r(m, n)$ denotes the image intensity field over pixel locations $(m, n)$ in the reference video frame, and $f_m(m, n)$ denotes the intensity field of the target video frame to be matched to the reference video frame through a mapping operator $M(m, n)$, then $f_r(m, n) = f_m(M(m, n))$. The mapping operator $M(m, n)$ can be described by a limited set of mapping parameters. As an example, the mapping operator $M(m, n)$ can be described as follows.

$$\begin{bmatrix} m' \\ n' \end{bmatrix} = \begin{bmatrix} a & b \\ c & d \end{bmatrix} \begin{bmatrix} m \\ n \end{bmatrix} + \begin{bmatrix} e \\ f \end{bmatrix},$$

where the parameters a, b, c, d, e and f completely define the mapping operator $M(m, n)$.

Figure 1:
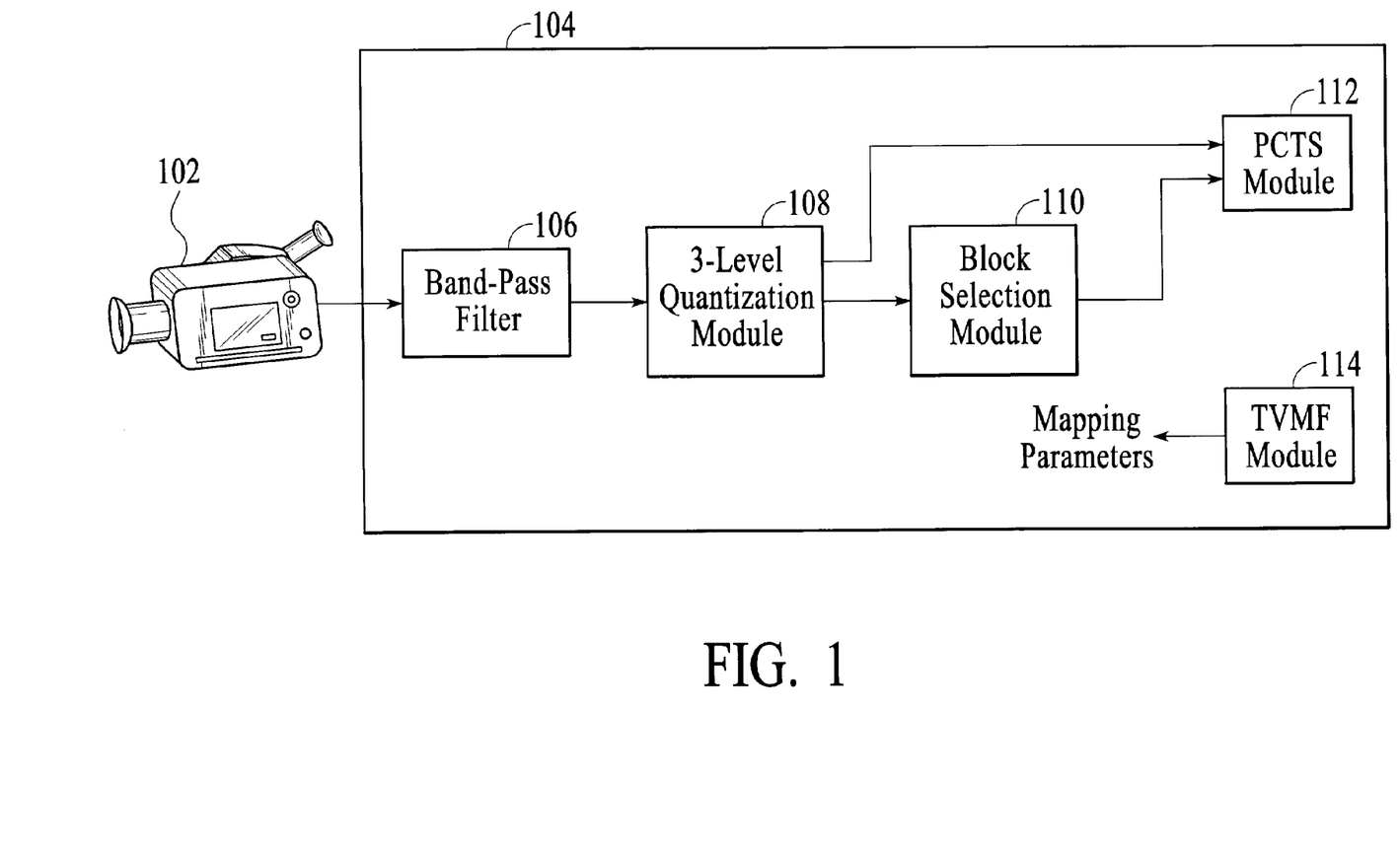
FIG. 1 is a diagram of a motion estimation system in accordance with an exemplary embodiment of the present invention.

With reference to FIG. 1, a block diagram of a motion estimation system 100 in accordance with an exemplary embodiment of the invention is shown. The motion estimation system operates to estimate motion between video frames using block matching to derive the mapping parameters that define the mapping operator $M(m, n)$. The motion estimation system is configured to perform block matching on video frames in which the pixel values have been quantized to three levels. The quantization of the pixel values allows the motion estimation system to perform block matching using simple XNOR operations, which increases the overall speed of the motion estimation process. In addition, the motion estimation system utilizes an efficient technique for computing the correlation based on digital words that result from the block matching. The correlation computation is based on using an efficient "1" bit counting and accumulation scheme during the block matching process. The use of this correlating technique further increases the speed of the motion estimation process.

As illustrated in FIG. 1, the motion estimation system includes a video camera 102 and a processing device 104. The video camera 102 operates to capture video frames or images of a scene of interest. The video camera may be a digital or analog video camera. Thus, the video camera can be any type of digital or analog video camera that is currently available in the market. The video camera is connected to the processing device 104 to transmit the captured video frames to the processing device. The processing device operates to process the received video frames to estimate the motion between two sequentially captured video frames to compute mapping parameters for mosaic image generation. If the video camera is an analog video camera, the processing device digitizes the received video frames for motion estimation using an analog-to-digital converter (not shown).

The processing device 104 of the motion estimation system 100 includes a band-pass filter 106, a 3-level quantization module 108, a block selection module 110, a packed correlation translation search (PCTS) module 112 and a translational vector model fit (TVMF) module 114. Although the components of the processing device are illustrated and described as separate modules, these components represent functional blocks, and consequently, may or may not be embodied in the form of physically separate modules. Thus, two or more of these components may be combined into a single module. Alternatively, some of these components may be divided into two or more modules. Therefore, the processing device may include fewer or more components than described and illustrated. In the exemplary embodiment, the components of the processing device are implemented as software in a personal computer with a MMX central processing unit. However, these components may be implemented in any combination of hardware, firmware and/or software.

The band-pass filter 106 of the processing device 104 operates to remove DC components of the captured video frames so that the overall operation of the motion estimation system 100 is less susceptible to errors due to brightness changes. Furthermore, the band-pass filter operates to remove high-frequency noise in the captured video frames. In the exemplary embodiment, the band-pass filter is configured to take the difference between results from two moving window low-pass filtering processes, as described in U.S. Pat. No. 6,122,017 issued to Taubman and assigned to Hewlett-Packard Company, which is explicitly incorporated herein by reference.

The operation of the band-pass filter 106 in accordance with the exemplary embodiment is now described. Let y[ij] denote the luminance sample from any given video frame at row i and column j. The band-pass filtered pixel, $\bar{y}[i,j]$, is computed according to the following equation.

$$\bar{y}[i, j] \triangleq \frac{1}{L^x L^y} \left( \sum_{p=1-L^y/2}^{L^y/2} \sum_{q=1-L^x/2}^{L^y/2} y[i+p, j+q] \right) - \frac{1}{W^x W^y} \left( \sum_{p=1-W^y/2}^{W^y/2} \sum_{q=1-W^x/2}^{W^y/2} y[i+p, j+q] \right).$$

In the above equation, $L^x$ and $L^y$ are the width and height of the "local scale" moving average window, while $W^x$ and $W^y$ are the width and height of the "wide scale" moving average window. The scaling operations may be reduced to shift operations by ensuring that each of these four dimensions is a power of two, in which case the entire bandpass filtering operation may be implemented with four additions, four subtractions and two shifts per pixel. The dimensions, $L^x$, $L^y$, $W^x$ and $W^y$, may be empirically determined. As an example, the dimensions $L^x=L^y=4$, $W^x=32$ and $W^y=16$ may be used for the band-pass filter operation.

The 3-level quantization unit 108 of the processing device 104 operates to quantize each pixel value of the received video frames to one of three levels so that the luminance value for each pixel of the video frames can be represented by two bits. The quantization is performed using a parameter, $T_b$. For a given filtered pixel value, $\bar{y}[i,j]$, the first bit is set to 1 if $\bar{y}[i,j]>T_b$. Otherwise, the first bit is set to 0. The second bit is set to 1 if $\bar{y}[i,j]<-T_b$. Otherwise, the second bit is set to 0. The quantization of pixel values to three levels serves the following purposes. First, with only three levels, a pixel can be represented by two bits, and thus, only a single byte is required to store the luminance values for four pixels. In addition, the three-level quantization allows for an extremely efficient correlation engine based on XNOR operations, as described below in reference to the PCTS module 112. Furthermore, since three levels are used rather than two levels with an absolute value as in edge detection, a high degree of threshold invariance is obtained due to the XNOR operation-based correlation engine. The reason for the invariance to the threshold is that there are three possible 2-bit representations from the quantization, "10", "00" and "01". Upon applying the XNOR operation, the following combinations and results exist.

| | |
|---|---|
| "10" XNOR "10" → "11" | "10" XNOR "00" → "01" |
| "10" XNOR "01" → "00" | "00" XNOR "10" → "01" |
| "00" XNOR "00" → "11" | "00" XNOR "01" → "10" |
| "01" XNOR "10" → "00" | "01" XNOR "00" → "10" |
| "01" XNOR "10" → "11" | |

From these possible comparisons, when considering the number of "1" bits in the result as the correlation contribution, a value with itself yields two "1" bits. A value with another value that comes from just across the threshold (e.g., "00" with "01", or "00" with "10") produces a single "1" bit. A value with another value separated by an intermediate quantization step (e.g., "10" with "01") yields no "1" bits. The threshold invariance is due to the fact that neighboring values on either side of the threshold still do produce a contribution to the cost function, albeit not as strong as values quantized to the same value.

The block selection module 110 of the processing device 104 operates to select candidate blocks from the target video frame so that each of these candidate blocks can be correlated with blocks of the reference video frame within a predefined search window. In the exemplary embodiment, each of the candidate blocks and the reference blocks includes a predefined multiple of 16×16 pixels. Thus, each candidate or reference block can be divided into a corresponding number of 16×16 pixel sub-blocks. The target video frame may be a later acquired video frame, e.g., the current video frame, with respect to the reference video frame. However, the target video frame may be a previously acquired video frame with respect to the reference video frame, in which case the determined motion estimation can be reversed to derive the "correct" motion estimation. The block selection module utilizes one or more criteria to select candidate blocks in the target video frame with edges and other feature-rich content for an effective correlation search result. The block selection module may use any criterion to select candidate blocks with feature-rich content. As an example, the block selection module may utilize a known edge detection technique to select candidate blocks with edges. In the exemplary embodiment, the candidate blocks are at least partially selected by the number of "1" bits contained in the blocks, since this number is a good indication of the feature-richness of the blocks.

The PCTS module 112 of the processing device 104 operates to find blocks in the reference video frame that "match" the candidate blocks of the target video frame to generate translation vectors for the candidate blocks. For a given candidate block of the target video frame, a predefined search window of the reference video frame is searched by correlating the candidate block with all possible blocks of the reference video frame within the search window. In the exemplary embodiment, the candidate block is correlated with each block of the reference video frame within the search window using XNOR operations. Since four quantized pixel values are defined by a single byte, the quantized pixel values for a row of a 16×16 pixel candidate sub-block can be represented by a 32-bit word. Consequently, an entire row of a 16×16 candidate sub-block can be correlated against a corresponding row of a 16×16 pixel sub-block of the reference video frame within the search window using only a simple XNOR operation executed by a 32-bit or greater processor. The correlation of the candidate sub-block with a sub-block of the reference video frame within the search window is performed on a row-by-row basis. The resulting correlation for each row of a 16×16 candidate sub-block is the sum of the number of "1" bits in the resulting 32-bit word. These resulting 32-bit words for the entire candidate block with respect to the block of the reference video frame, which is defined by a particular shift within the search window, are then summed to derive a correlation value. The process is repeated for each shift to generate a correlation surface defined by the correlation values. The maximum correlation value in the correlation surface is taken as the translation estimate for the given candidate block. The maximum correlation value is then used to derive a translational vector, which describes the estimated displacement of the candidate block from the reference video frame to the target video frame.

On the Intel Architecture (IA) instruction set, there exists a bottleneck in the correlation process performed by the PCTS module 112. The bottleneck for the correlation process is the counting of "1" bits in the 32-bit XNOR result using conventional techniques, such as a look-up-table (LUT). Thus, the PCTS module performs a unique operation for counting "1" bits in a binary word of size 2 raised to the power of m, where m is any integer, to significantly reduce the bottleneck of the correlation process.

The counting operating performed by the PCTS module 112 is based on a counting technique, as described below with reference to FIGS. 2A, 2B and 2C using a 32-bit word example, "01101101101000111111111011010110110", which is a word of size 2 raised to the power of 5. The counting technique involves m number of similar stages. Thus, in this example, the counting technique involves five stages, since m=5.

Figure 2A:
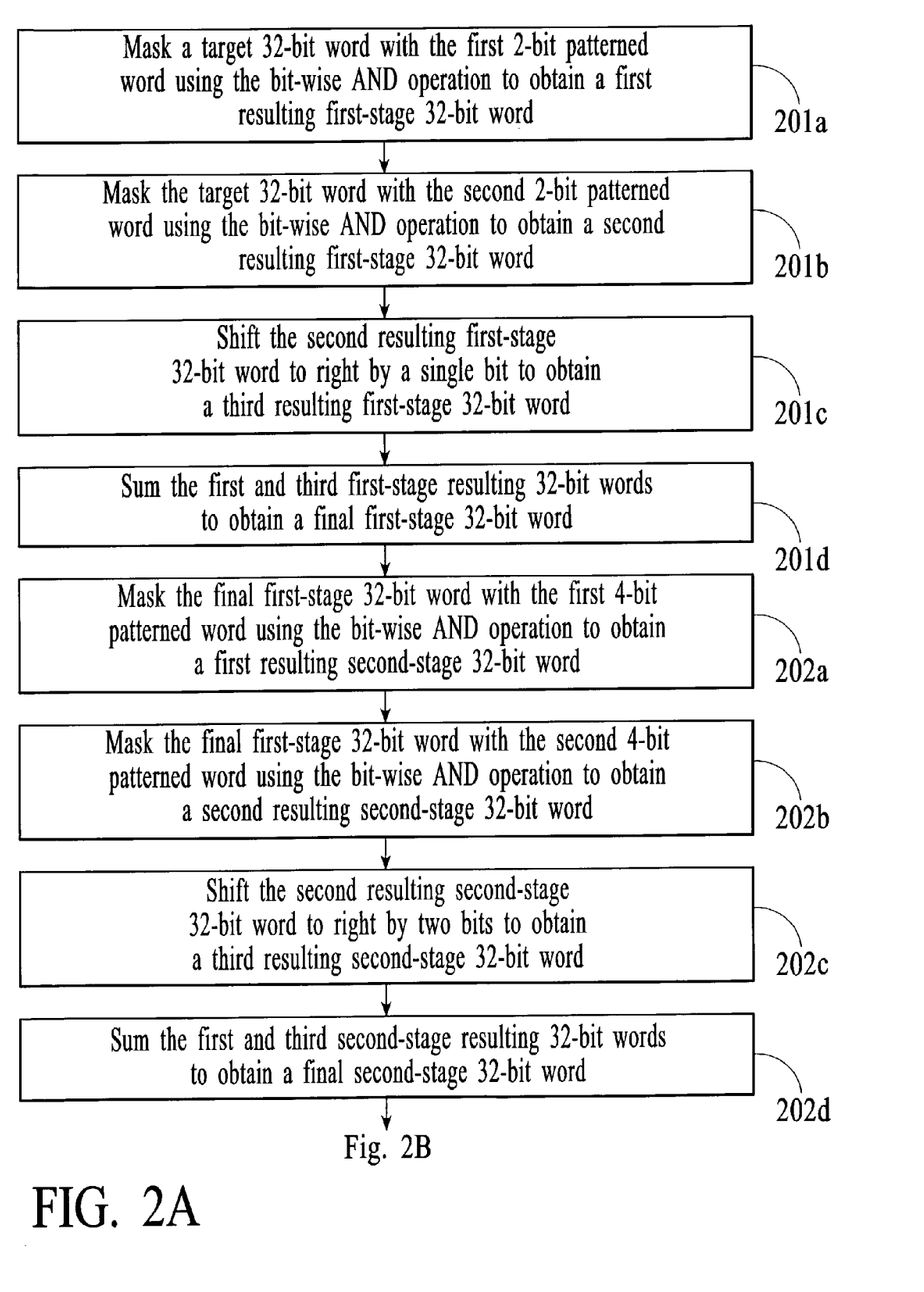
FIGS. 2A–2C is a flow diagram of a counting technique utilized by the packed correlation translation search (PCTS) module of the motion estimation system of FIG. 1.

The first stage of the counting technique involves four steps 201a, 201b, 201c and 201d, as illustrated in FIG. 2A. At step 201a, the target word is masked by the 32-bit word, "01010101010101010101010101010101", which is referred herein as the "first 2-bit patterned word", using the bit-wise AND operation to obtain a first resulting first-stage 32-bit word, "01000101010001010101010000010100", as shown below.

```
      01101101010011111111011010110110
   &  01010101010101010101010101010101
      01000101010001010101010000010100
```

At step 201b, the target word is masked by the 32-bit word, "10101010101010101010101010101010", which is referred herein as the "second 2-bit patterned word", using the bit-wise AND operation to obtain a second resulting first-stage 32-bit word, "00101000000010101010001010100010", as shown below.

```
          01101101010011111111011010110110
    &     10101010101010101010101010101010
          00101000000010101010001010100010
```

Next, at step 201c, the second resulting first-stage 32-bit word from step 201b is shifted to the right by a single bit to obtain a third resulting first-stage 32-bit word, "00010100000001010101000101010001". At step 201d, the resulting 32-bit words from steps 201a and 201c are added together to obtain a final first-stage 32-bit word "01001101010011111111011010110110", as shown below.

```
          01000101010001010101010000010100
    &     00101000000010101010001010100010
          01001101010011111111011010110110
```

The final first-stage 32-bit word of the counting technique has the following property. If the original word and the final first-stage 32-bit word are divided into 2-bit segments, each 2-bit segment of the final first-stage 32-bit word contains a 2-bit number which is the sum of "1" bits in the corresponding 2-bit segment of the original word.

The second stage of the counting technique also involves four steps 202a, 202b, 202c and 202d, as illustrated in FIG. 2A. At step 202a, the final first-stage 32-bit word is masked by the 32-bit word, "00110011001100110011001100110011", which is referred herein as the "first 4-bit patterned word", using the bit-wise AND operation to obtain a first resulting second-stage 32-bit word, "00010001000000100010000100100001", as shown below.

```
          01001101010011111111011010110110
    &     00110011001100110011001100110011
          00010001000000100010000100100001
```

At step 202b, the final first-stage 32-bit word is masked by the 32-bit word, "11001100110011001100110011001100", which is referred herein as the "second 4-bit patterned word", using the bit-wise AND operation to obtain a second resulting second-stage 32-bit word, "01001000010010001010010001000100", as shown below.

```
          01001101010011111111011010110110
    &     11001100110011001100110011001100
          01001000010010001010010001000100
```

Next, at step 202c, the second resulting second-stage 32-bit word from step 202b is shifted to the right by two bits to obtain a third resulting second-stage 32-bit word, "00010010000100100010010010010001". At step 202d, the resulting 32-bit words from steps 202a and 202c are added together to obtain a final second-stage 32-bit word, "00100011000101000100001000110010", as shown below.

```
          00010001000000100010000100100001
    &     00010010000100100010010010010001
          00100011000101000100001000110010
```

The final second-stage 32-bit word of the counting technique has the following property. If the original word and the final second-stage 32-bit word are divided into 4-bit segments, each 4-bit segment of the final second-stage 32-bit word contains a 4-bit number which is the sum of "1" bits in the corresponding 4-bit segment of the original word.

Figure 2B:
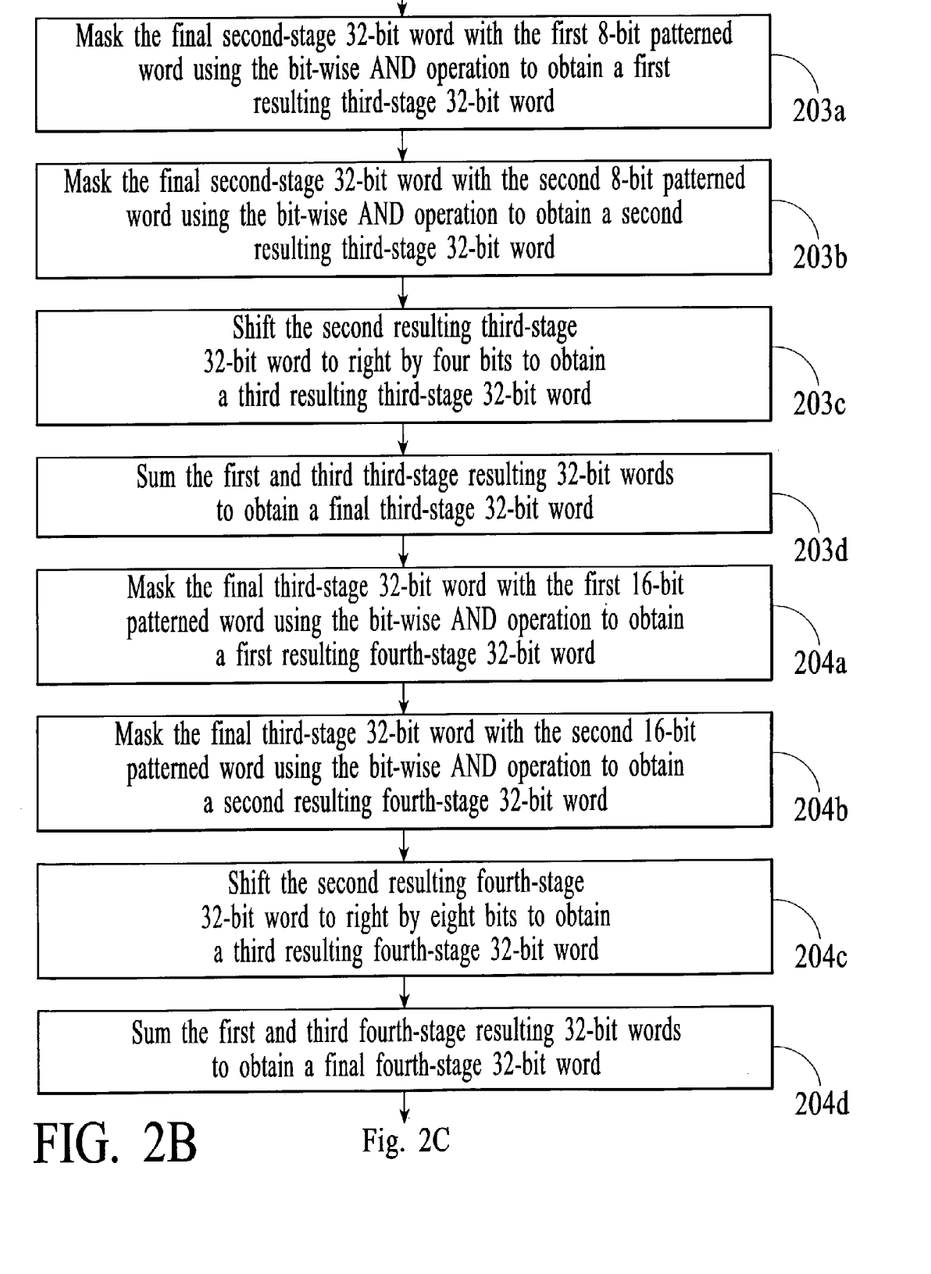

The third stage of the counting technique involves four steps 203a, 203b, 203c and 203d, as illustrated in FIG. 2B. At step 203a, the final second-stage 32-bit word is masked by the 32-bit word, "00001111000011110000111100001111", which is referred herein as the "first 8-bit patterned word", using the bit-wise AND operation to obtain a first resulting third-stage 32-bit word, "00000011000001000000001000000010", as shown below.

```
          00100011000101000100001000110010
    &     00001111000011110000111100001111
          00000011000001000000001000000010
```

At step 203b, the final second-stage 32-bit word is masked by the 32-bit word, "11110000111100001111000011110000", which is referred herein as the "second 8-bit patterned word", using the bit-wise AND operation to obtain a second resulting third-stage 32-bit word, "00100000000100000100000000110000", as shown below.

```
          00100011000101000100001000110010
    &     11110000111100001111000011110000
          00100000000100000100000000110000
```

Next, at step 203c, the second resulting third-stage 32-bit word from step 203b is shifted to the right by four bits to obtain a third resulting third-stage 32-bit word, "00000010000000010000010000000011". At step 203d, the resulting 32-bit words from steps 203a and 203c are added together to obtain a final third-stage 32-bit word, "00000101000001010000011000000101", as shown below.

```
          00000011000001000000001000000010
    &     00000010000000010000010000000011
          00000101000001010000011000000101
```

The final third-stage 32-bit word of the counting technique has the following property. If the original word and the final third-stage 32-bit word are divided into 8-bit segments, each 8-bit segment of the final third-stage 32-bit word contains an 8-bit number which is the sum of "1" bits in the corresponding 8-bit segment of the original word.

The fourth stage of the counting technique involves four steps 204a, 204b, 204c and 204d, as illustrated in FIG. 2B. At step 204a, the final third-stage 32-bit word is masked by the 32-bit word, "00000000111111110000000011111111", which is referred herein as the "first 16-bit patterned word", using the bit-wise AND operation to obtain a first resulting fourth-stage 32-bit word "00000000000001010000000000000101", as shown below.

```
    00000101000001010000011000000101
&   00000000111111110000000011111111
    00000000000001010000000000000101
```

At step 204b, the final third-stage 32-bit word is masked by the 32-bit word, "11111111000000001111111100000000", which is referred herein as the "second 16-bit patterned word", using the bit-wise AND operation to obtain a second resulting fourth-stage 32-bit word, "00000101000000000000011000000000", as shown below.

```
    00000101000001010000011000000101
&   11111111000000001111111100000000
    00000101000000000000011000000000
```

Next, at step 204c, the second resulting fourth-stage 32-bit word from step 204b is shifted to the right by eight bits to obtain a third resulting fourth-stage 32-bit word, "00000000000001010000000000000110". At step 204d, the resulting 32-bit words from steps 204a and 204c are added together to obtain a final fourth-stage 32-bit word, "00000000000001010000000000001011", as shown below.

```
    00000000000001010000000000000101
&   00000000000001010000000000000110
    00000000000001010000000000001011
```

The final fourth-stage 32-bit word of the counting technique has the following property. If the original word and the final fourth-stage 32-bit word are divided into 16-bit segments, each 16-bit segment of the final fourth-stage 32-bit word contains a 16-bit number which is the sum of "1" bits in the corresponding 16-bit segment of the original word.

Figure 2C:
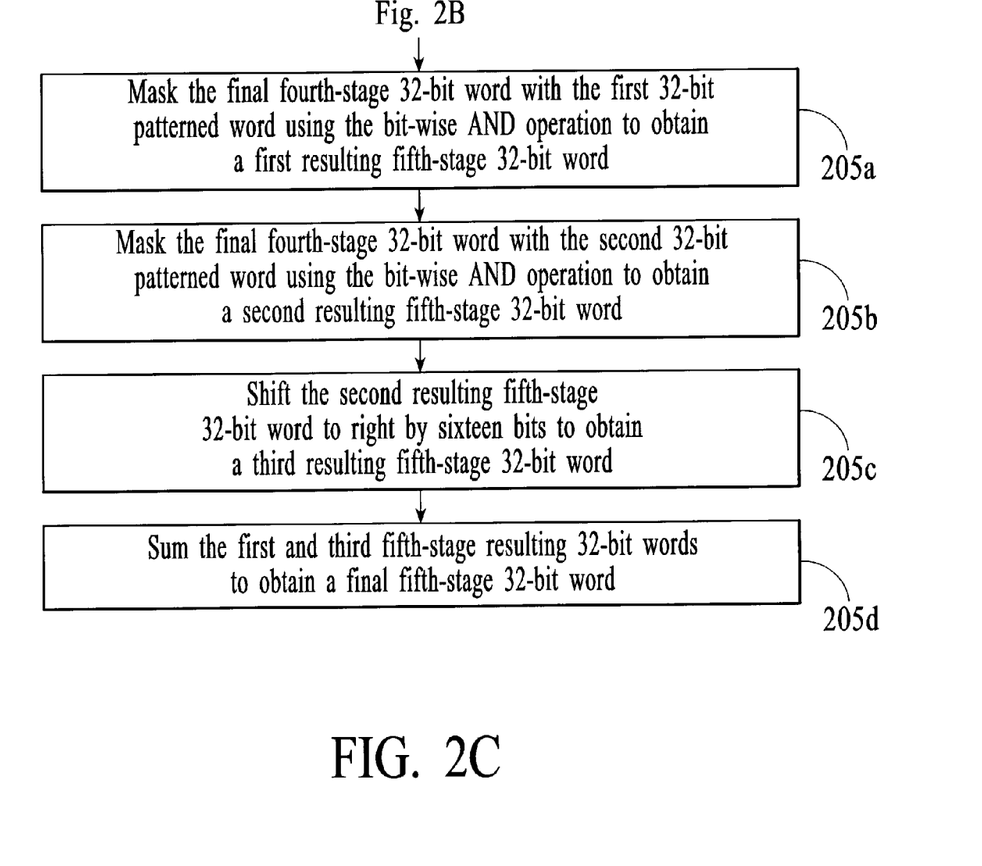

The fifth stage of the counting technique also involves four steps 205a, 205b, 205c and 205d, as illustrated in FIG. 2C. At step 205a, the final fourth-stage 32-bit word is masked by the 32-bit word, "00000000000000001111111111111111", which is referred herein as the "first 32-bit patterned word", using the bit-wise AND operation to obtain a first resulting fifth-stage 32-bit word, "00000000000000000000000000001011", as shown below.

```
    00000000000001010000000000001011
&   00000000000000001111111111111111
    00000000000000000000000000001011
```

At step 205b, the final fourth-stage 32-bit word of the fourth stage is masked by the 32-bit word, "11111111111111110000000000000000", which is referred herein as the "second 16-bit patterned word", using the bit-wise AND operation to obtain a second resulting fifth-stage 32-bit word, "00000000000001010000000000000000", as shown below.

```
    00000000000001010000000000001011
&   11111111111111110000000000000000
    00000000000001010000000000000000
```

Next, at step 205c, the second resulting fifth-stage 32-bit word from step 205b is shifted to the right by sixteen bits to obtain a third resulting fifth-stage 32-bit word, "00000000000000000000000000001010". At step 205d, the resulting 32-bit words from steps 205a and 205c are added together to obtain a final fifth-stage 32-bit word, "00000000000000000000000000010101", as shown below.

```
    00000000000000000000000000001011
&   00000000000000000000000000001010
    00000000000000000000000000010101
```

The final fifth-stage 32-bit word of the fifth stage represents the number of "1" bits in the original 32-bit word. Although the counting technique has been described using a 32-bit word example, the technique can be shortened or extended to count "1" bits in different sized words, such as 8-bit, 16-bit and 64-bit words. As an example, the first three stages can be used to count "1" bits in 8-bit words. As another example, the five stages and an additional sixth stage can be used to count "1" bits in a 64-bit word. Additional stages of the counting techniques can be added using the following formula. For any $n^{th}$ stage, the final (n−1)-stage m-bit word is masked using the first and second $2^n$-bit patterned words to derive first and second resulting n-stage m-bit words, where m is the number of bits in the original word. The second resulting n-stage m-bit word is then shifted to the right by $2^n/2$ bits to obtain a third resulting n-stage m-bit word. Next, the first and third resulting n-stage m-bit words are summed to obtain the final n-stage m-bit word.

The counting operation performed by the PCTS module 112 is a modified version of the above-described counting technique. The PCTS module takes advantage of interesting features of the described counting technique to increase the speed of the correlation process. One of the interesting features is that the final 32-bit word of the fifth stage represents a sum that can be no greater 32, which means that only six bits of the final 32-bit word are being utilized. A similar feature can be found in the final 32-bit word of the third stage, where eight bits are used to represent at most the number 8. The PCTS module takes advantage of these features to combine one or more of the counting stages for multiple words. Thus, the total number of stages performed for a given number of words is reduced. In particular, the first three stages are executed for multiple words to derive partial results, which are then added together to get a partial sum. The fourth and fifth stages can then be executed on the partial sum. Thus, the fourth and fifth stages are performed only once for all the words being processed.

Figure 3:
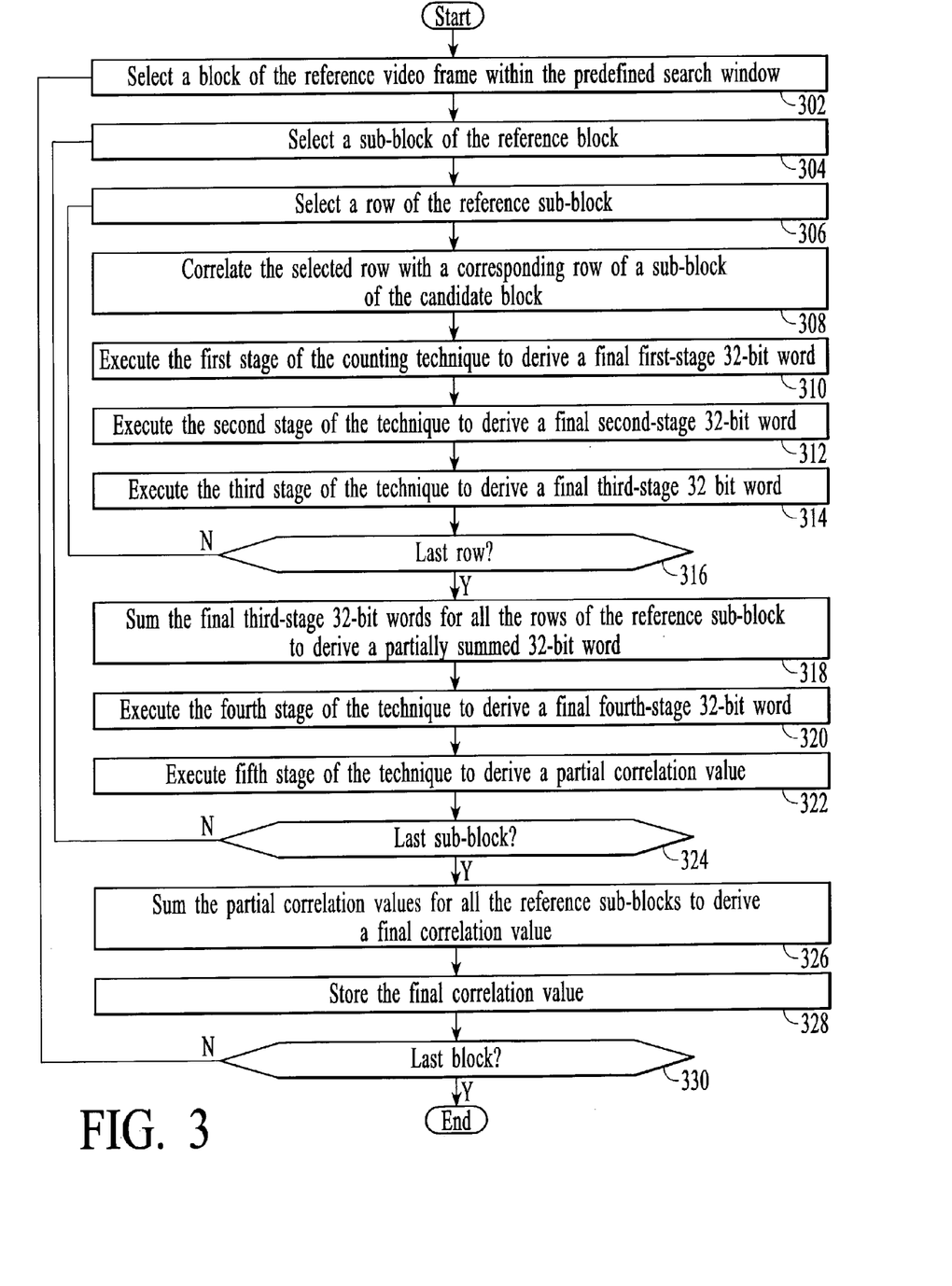
FIG. 3 is a flow diagram, illustrating the operation of the PCTS module.

The operation of the PCTS module 112 to derive the correlation values of a correlation surface for a candidate block of a target video frame is described with reference to the flow diagram of FIG. 3. The correlation surface is derived by correlating the candidate block with all possible blocks of a reference video frame within a predefined search window. In this description, each of the candidate block and the blocks of the reference video frame within the search window is assumed to include a predefined multiple of 16×16 pixels, where the luminance value for each pixel in the blocks is represented by two bits. Thus, each candidate or reference block can be divided into a corresponding number of 16×16 pixel sub-blocks. At step 302, a block of the reference video frame within the predefined search window is selected to be correlated with the candidate block. Next, at step 304, a 16×16 sub-block of the selected reference block is selected. At step 306, a row of the candidate sub-block is selected to be processed. Since the candidate sub-block is a 16×16 pixel block and the luminance value for each pixel is represented by two bits, the selected row of the candidate sub-block is represented by a 32-bit word. At step 308, the selected row of the reference sub-block is correlated with a corresponding row of a sub-block of the candidate block to derive a correlated 32-bit word. At step 310, the first stage of the counting technique is executed on the correlated 32-bit word to derive a final first-stage 32-bit word, which has the property of having 2-bit numbers that equal the sums of "1" bits in the corresponding 2-bit segments of the correlated 32-bit words. At step 312, the second stage of the counting technique is executed on the final first-stage 32-bit word to derive a final second-stage 32-bit word, which has the property of having 4-bit numbers that equal the sums of "1" bits in the corresponding 4-bit segments in the correlated 32-bit words. At step 314, the third stage of the counting technique is executed on the final second-stage 32-bit word to derive a final third-stage 32-bit word, which has the property of having 8-bit numbers that equal the sums of "1" bits in the corresponding 8-bit segments in the correlated 32-bit words.

Next, at step 316, a determination is made whether the current row being processed is the last row for the candidate sub-block to be processed. If not, the process proceeds back to step 306, at which the next row of the candidate sub-block is selected to be processed. However, if the current row is the last row of the candidate sub-block, then the process proceeds to step 318, at which the final third-stage 32-bit words for all the rows of the candidate sub-block are summed to derive a partially summed 32-bit word. Next, at step 320, the fourth stage of the counting technique is executed on the partially summed 32-bit word to derive a final fourth-stage 32-bit word, which has the property of having 16-bit numbers that equal the sums of "1" bits in the corresponding 16-bit segments in the correlated 32-bit words for all the rows of the 16×16 candidate block. At step 322, the fifth stage of the counting technique is executed on the final fourth-stage 32-bit word to derive an output 32-bit word, which is the final count of "1" bits for all the rows of the candidate block. The output 32-bit word is a partial correlation value for the selected block of the reference video frame within the search window.

Next, at step 324, a determination is made whether the current sub-block is the last sub-block of the selected reference block. If not, the process proceeds back to step 304, at which the next sub-block of the selected reference block is selected to be processed. However, if the current sub-block is the last sub-block of the reference block, then the process proceeds to step 326, at which the partial correlation values for all the sub-blocks of the selected reference block are summed to derive a final correlation value. At step 328, the final correlation value is stored.

Next, at step 330, a determination is made whether the current block of the reference video frame within the search window is the last block within the search window to be correlated. If not, the process proceeds back to step 302, at which the next block of the reference video frame within the search window is selected to be processed. However, if the current block of the reference video frame is the last block within the search window to be correlated, then the process comes to an end. In this fashion, each candidate block of the target video frame can be correlated with blocks of the reference video frame within the respective search window to obtain translational vectors to estimate motion between the target video frame and the reference frame.

In the exemplary embodiment, the correlation process performed by the PCTS module 112 is implemented on an MMX platform, where there are 64-bit words and 64-bit operations involved. Since there are 32 bits for each row of 16×16 pixel sub-blocks, two rows of a 16×16 pixel sub-block can be simultaneously processed. The following is a pseudo-code for the correlation processes performed by the PCTS module in accordance with the exemplary embodiment.

```
//    o   FOR each 16×16 block in the match image window
//        o   set up the ptr array, byte_ptr_array, so even entries
//            point to the beginning of each line within this 16×16
//            block.
//        o   FOR each vertical search offset (translation to test)
//            in the vertical search range.
//            o   set up the byte_ptr_array odd entries to point to
//                the beginning of the reference image lines that
//                need to be correlated with the current 16×16 match
//                region, at the current vertical search offset.
//                NOTE: no horizontal offset into the line is set yet,
//                whereas this has been taken care of for the match
//                pointers.
//            o   FOR each horizontal set of 8 consecutive horizontal
//                search offsets (i.e., divide the horizontal search
//                range into step sizes of 8, with the inner loop to
//                follow filling in the 8*m+n shifts, where m is the
//                index for this loop and n=0 . . . 7 is taken care of by
//                the loop to follow.)
//    --------------MMX Code Segment ---- BEGIN ----
//                o   zero out mm4 . . . mm7 since they'll accumulate results
//                    for this 16×16 match block at the current search
//                    offsets.
//                o   Set up the intra-line offsets for the ref pointers
//                    stored in odds of byte_ptr_array so they align with
```

```
//           the beginning of the search specified by the current
//           horizontal shift set (i.e., the 'm' defined above).
//        o  FOR each of the 16 lines in the current match region
//           o  load the 32-bit match word which holds the 16
//              pixels from the current line in the current 16×16
//              match region. (pointed to by appropriate even entry
//              in byte_line_ptr)
//           o  load the 24 pixels of reference line data using the
//              appropriate odd line from the byte_line_ptr, and
//              the intra-line offset created just before this loop.
//              48 bits are useful here since the 2 bit shifts will
//              be used to generate the n=0 . . . 7 offsets.
//           o  perform the shifts of n=0 . . . 7, evaluate the correlations,
//              and accumulate the results in mm4 . . . mm7. Evaluating
//              the correlations utilizes the 5-step approach of
//              summing the number of neighboring '1' values
//              (except the first stage which sums '0's). The accumu-
//              lation stops after the 3-rd level and accumulates
//              results of that stage in the mm4 . . . mm7 registers.
//              The registers use mm4 LODW for shift n=0, mm4 HODW
//              for shift n=1, mm5 LODW for shift n=2, . . .
//           o  Finish the accumulation of the correlation result
//              in mm4 . . . mm7 (i.e., levels 4 and 5).
//        o  Accumulate these results in main memory
//           (shift_results_array).
// -------------MMX Code Segment ---- END ----
```

Turning back to FIG. 1, the translational vector model fit module 114 of the processing device 104 operates to fit the translational vectors from the PCTS module using standard regression techniques to obtain the mapping parameters a, b, c, d, e and f that define the mapping operator M(m, n).

Figure 4:
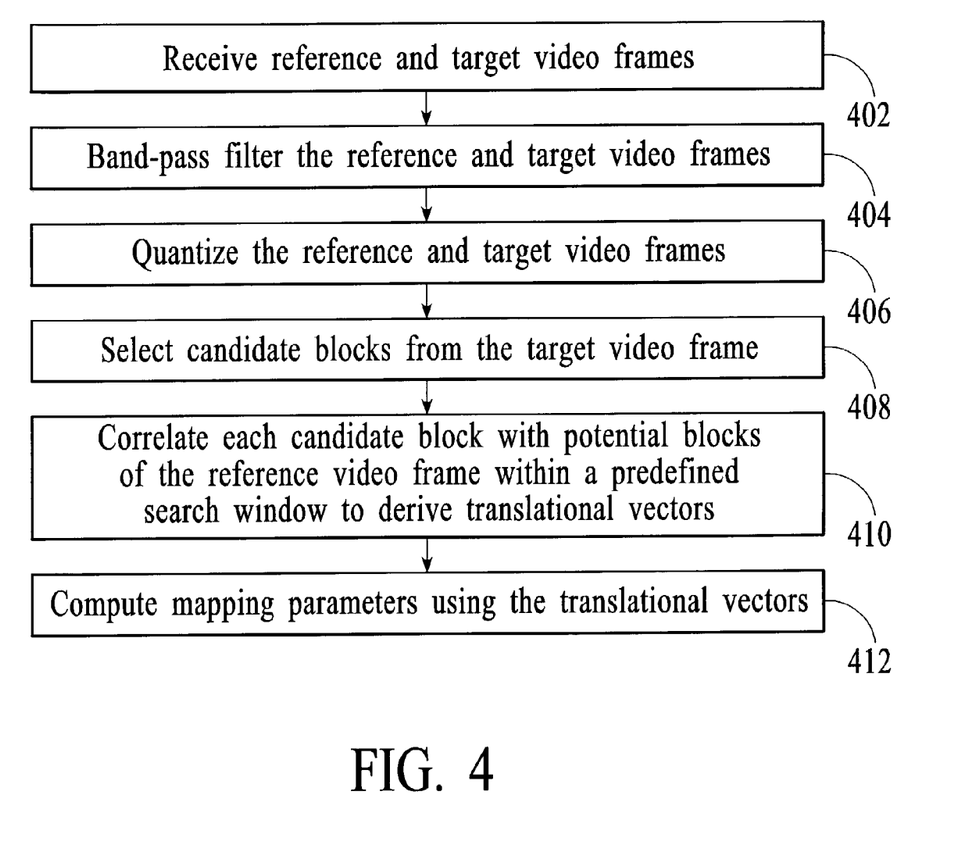
FIG. 4 is a flow diagram of a method of estimating motion between video frames in accordance with an exemplary embodiment of the present invention.

A method of estimating motion between successively captured video frames in accordance with an exemplary embodiment of the invention is described with reference to FIGS. 1 and 4. At step 402, a reference video frame and a target video frame are received. Next, at step 404, the reference and target video frames are band-pass filtered. At step 406, the reference and target video frames are quantized such that the luminance value of each pixel of the video frames are represented by two 5 bits. At step 408, candidate blocks are selected from the target video frame. The selection of candidate blocks may be based on feature-rich content of the blocks such as edges. Next, at step 410, each candidate block is correlated with potential blocks of the reference video frame within a predefined search window to derive translational vectors. At step 412, mapping parameters of the mapping operator are computed using the translational vectors. The mapping parameters define the motion between the reference and target video frames.

Although a specific embodiment of the invention has been described and illustrated, the invention is not to be limited to the specific forms or arrangements of parts so described and illustrated. The scope of the invention is to be defined by the claims appended hereto and their equivalents.

What is claimed is:

1. A system for estimating motion between images comprising:
   a quantizing module configured to quantize first and second digital images such that original pixel values of said first and second digital images are converted to quantized pixel values, said quantized pixel values corresponding to predefined ranges of said original pixel values; and
   a search module configured to correlate candidate image blocks of said second digital image with potential image blocks of said first digital image to derive translational indicators for the candidate image blocks, said translational indicators being related to the motion between said first and second digital images, said search module being configured to perform XNOR operations on said quantized pixel values to produce particular type bits that are indicative of correlation between said candidate image blocks of said second digital image and said potential image blocks of said first digital image.

2. The system of claim 1 wherein said quantizing module is configured to quantize each of said original pixel values of said first and second digital images into one of three quantized values, said three quantized values being represented by two bits.

3. The system of claim 2 wherein said search module is configured compute correlation values, said correlation values corresponding to the number of particular type bits contained in correlated binary words resulting from correlation of said candidate image blocks with said potential image blocks.

4. The system of claim 3 wherein said search module is configured to perform bit-wise AND operations on an input binary word using a pair of first and second masking binary words to derive first and second resulting binary words, said search module being further configured to perform a shifting operation to shift said second resulting binary word by a predefined number of bits to derive a third resulting binary word, said search module being further configured to perform a summing operation to sum said first and third resulting binary words to derive a final binary word, said final binary word including a binary representation of the number of particular type bits in a selected portion of said input binary word.

5. The system of claim 4 wherein said first and second masking binary words contain bits such that each bit of said second masking binary word is different than a corresponding bit in said first masking binary word.

6. The system of claim 5 wherein said search module is configured to use a first m-bit patterned masking word and a second m-bit patterned masking words to perform said bit-wise AND operations, where m is an integer greater than one, said first m-bit patterned masking word including s bits in a repeating m-bit pattern of m/2 consecutive first type bits followed by m/2 consecutive second type bits, and wherein said search module is configured to perform said shifting operation to shift said second resulting binary word to the right by m/2 bits to derive said third resulting binary word.

7. The system of claim 4 wherein said search module is configured to individually perform said bit-wise AND operations, said shifting operation and said summing operation for said correlated binary words to derive a plurality of third resulting binary words.

8. The system of claim 7 wherein said search module is configured to perform said bit-wise AND operations, said shifting operation and said summing operation using a partially summed binary word as said input binary word, said partially summed binary word being a sum of said third resulting binary words.

9. The system of claim 1 further comprising an image block selection module operatively coupled to said quantization module to receive said second digital image, said image block selection module being configured to select said candidate image blocks from a plurality of image blocks of s said second digital image based on a predefined criterion.

10. The system of claim 9 wherein said image block selection module is configured to select said candidate image blocks from said plurality of image blocks of said second digital image based on the number of particular type bits contained in said image blocks.

11. A method of estimating motion between images comprising:
quantizing first and second digital images such that original pixel values of said first and second digital images are converted to quantized pixel values, said quantized pixel values corresponding to predefined ranges of said original pixel values; and
correlating candidate image blocks of said second digital image with potential image blocks of said first digital image to derive translational indicators for the candidate image blocks, said translational indicators being related to motion between said first and second digital images, said correlating including performing XNOR operations on said quantized pixel values to produce particular type bits that are indicative of correlation between said candidate image blocks of said second digital image and said potential image blocks of said first digital image.

12. The method of claim 11 wherein said step of correlating includes counting the number of particular type bits in correlated binary words, said counting comprising:
performing bit-wise AND operations on an input binary word using a pair of first and second masking binary words to derive first and second resulting binary words, said first and second masking binary words containing bits such that each bit of said second masking binary word is different than a corresponding bit in said first masking binary word;
shifting said second resulting binary word by a predefined number of bits to derive a third resulting binary word; and
summing said first and third resulting binary words to derive a final binary word, said final binary word including a binary representation of the number of said particular type bits in a selected portion of said input binary word.

13. The method of claim 12 wherein said step of performing said bit-wise AND operations includes performing bit-wise operations on said input binary word using a first m-bit patterned masking word and a second m-bit patterned masking word, where m is an integer greater than one, said first m-bit patterned masking word including bits in a repeating m-bit pattern of m/2 consecutive first type bits followed by m/2 consecutive second type bits, and wherein said step of shifting said second resulting binary word includes shifting said second resulting binary word to the right by m/2 bits to derive said third resulting binary word.

14. The method of claim 12 further comprising a step of storing said final binary word for said input binary word.

15. The method of claim 14 wherein said steps of performing, shifting, summing and storing are executed for each of said correlated binary words to derive a set of final binary words.

16. The method of claim 15 further comprising a step of summing said final binary words to derive a partially summed binary word.

17. The method of claim 16 further comprising repeating said steps of performing, shifting and summing for said partially summed binary word.

18. The method of claim 11 wherein said step of quantizing includes quantizing each of said original pixel value of said first and second digital images into one of three quantized values, said three quantized values being represented by two bits.

19. The method of claim 11 further comprising selecting said candidate image blocks from a plurality of image blocks of said second digital image based on the number of particular type bits contained in said image blocks.

20. A program storage device readable by a machine, tangibly embodying a program of instructions executable by said machine to perform a method of estimating motion between images, said method comprising:
quantizing first and second digital images such that original pixel values of said first and second digital images are converted to quantized pixel values, said quantized pixel values corresponding to predefined ranges of said original pixel values; and
correlating candidate image blocks of said second digital image with potential image blocks of said first digital image to derive translational indicators for the candidate image blocks, said translational indicators being related to motion between said first and second digital images, said correlating including performing XNOR operations on said quantized pixel values to produce particular type bits that are indicative of correlation between said candidate image blocks of said second digital image and said potential image blocks of said first digital image.

21. The program storage device of claim 20 wherein said step of correlating includes counting the number of particular type bits in correlated binary words, said counting comprising:
performing bit-wise AND operations on an input binary word using a pair of first and second masking binary words to derive first and second resulting binary words, said first and second masking binary words containing bits such that each bit of said second masking binary word is different than a corresponding bit in said first masking binary word;
shifting said second resulting binary word by a predefined number of bits to derive a third resulting binary word; and summing said first and third resulting binary words to derive a final binary word, said final binary word including a binary representation of the number of said particular type bits in a selected portion of said input binary word.

22. The program storage device of claim 21 wherein said step of performing said bit-wise AND operations includes performing bit-wise operations on said input binary word using a first m-bit patterned masking word and a second m-bit patterned masking word, where m is an integer greater than one, said first m-bit patterned masking word including bits in a repeating m-bit pattern of m/2 consecutive first type bits followed by m/2 consecutive second type bits, and wherein said step of shifting said second resulting binary word includes shifting said second resulting binary word to the right by m/2 bits to derive said third resulting binary word.

23. The program storage device of claim 20 wherein said step of quantizing includes quantizing each of said original pixel value of said first and second digital images into one of three quantized values, said three quantized values being represented by two bits.

24. The program storage device of claim 20 further comprising selecting said candidate image blocks from a plurality of image blocks of said second digital image based on the number of particular type bits contained in said image blocks.

* * * * *

UNITED STATES PATENT AND TRADEMARK OFFICE
CERTIFICATE OF CORRECTION

PATENT NO. : 7,120,195 B2
APPLICATION NO. : 10/282773
DATED : October 10, 2006
INVENTOR(S) : Andrew Patti et al.

It is certified that error appears in the above-identified patent and that said Letters Patent is hereby corrected as shown below:

In column 13, line 40, after "two" delete "5".

In column 14, line 67, in Claim 6, after "including" delete "s".

In column 15, line 22, in Claim 9, delete "s" before "said".

Signed and Sealed this

Twenty-second Day of December, 2009

David J. Kappos
*Director of the United States Patent and Trademark Office*